Aug. 13, 1968   P. C. TREXLER   3,396,701
CONTAINER FOR LIVE GNOTOBIOTIC AXENIC ANIMALS
Filed Aug. 15, 1966   2 Sheets-Sheet 1

INVENTOR.
Philip C. Trexler
BY
Morse, Altman & Oates

United States Patent Office 3,396,701
Patented Aug. 13, 1968

3,396,701
CONTAINER FOR LIVE GNOTOBIOTIC
AXENIC ANIMALS
Philip C. Trexler, Wilmington, Mass., assignor to The
Charles River Breeding Laboratories, Inc., Wilmington, Mass., a corporation of Massachusetts
Filed Aug. 15, 1966, Ser. No. 572,487
3 Claims. (Cl. 119—15)

This invention relates to shipping containers for live animals and particularly to shipping containers providing a sterile environment for gnotobiotic animals.

Gnotobiotic animals include animals of only known biological species such as axenic animals bred and reared so as to be free of contamination by other biological species, particularly micro-organisms. Such animals, particularly small animals, are bred and reared under carefully controlled sterile conditions in isolators and constitute a valuable produce useful in medical and biological research.

The present invention specifically is concerned with an improved container for handling and shipping live animals. This container, which is capable of maintaining the animals in a healthy condition free of contamination by microorganisms, provides a main lock that facilitates transfer of the animals and other relatively large objects from the container in an axenic condition and that can be readily sealed against the admission of contaminants. The primary object of the present invention is to provide, in combination with such a container, gloves for handling animals and materials in the container while sealed and an auxiliary lock, in association therewith, for inserting and removing relatively small objects to and from the container, in a simplified manner.

Other objects of the invention will in part be obvious and will in part appear hereinafter.

The invention accordingly comprises the apparatus possessing the construction, combination of elements and arrangement of parts which are exemplified in the following detailed disclosure, the scope of which will be indicated in the appended claims. For a fuller understanding of the nature and objects of the invention, reference should be had to the following detailed description, taken in connection with the accompanying drawings wherein:

As indicated above an isolator provides a closed system within which axenic, or germ-free, animals may be bred and reared. Its sealed chamber has provision for the circulation of fresh, uncontaminated air and its main lock provides access to the chamber contents. These contents include the animals themselves, as well as the various materials, such as cages and food required for the care and sustenance of the animals. Air is circulated by way of filters which remove all micro-organisms including microflora and microfauna. An isolator lock is a vestibular double-closure chamber which, after being sealed off from both the isolator chamber and the outside environment, can be sterilized. For example, in order to remove an object, e.g., an animal, from the isolator without contaminating the sealed environment thereof, the practice has been: to seal the inner closure between the isolator and the main lock, and the outer closure between the main lock and the outside environment; next to sterilize the interior of the main lock by introducing a sterilizing medium, for example, a hot vapor such as steam or a chemical agent such as ethylene oxide, into the main lock; and then to open the inner door, to transfer the object to the main lock and to reseal the inner closure prior to opening the outer closure. It has been the practice to remove much smaller objects, such as fecal samples, in similar fashion. In accordance with the present invention, the auxiliary lock may be opened from the inside with the aid of the gloves projecting into the container chamber, next may be sealed and then may be opened from the outside in order to permit removal of the small object therein.

Figure 1:
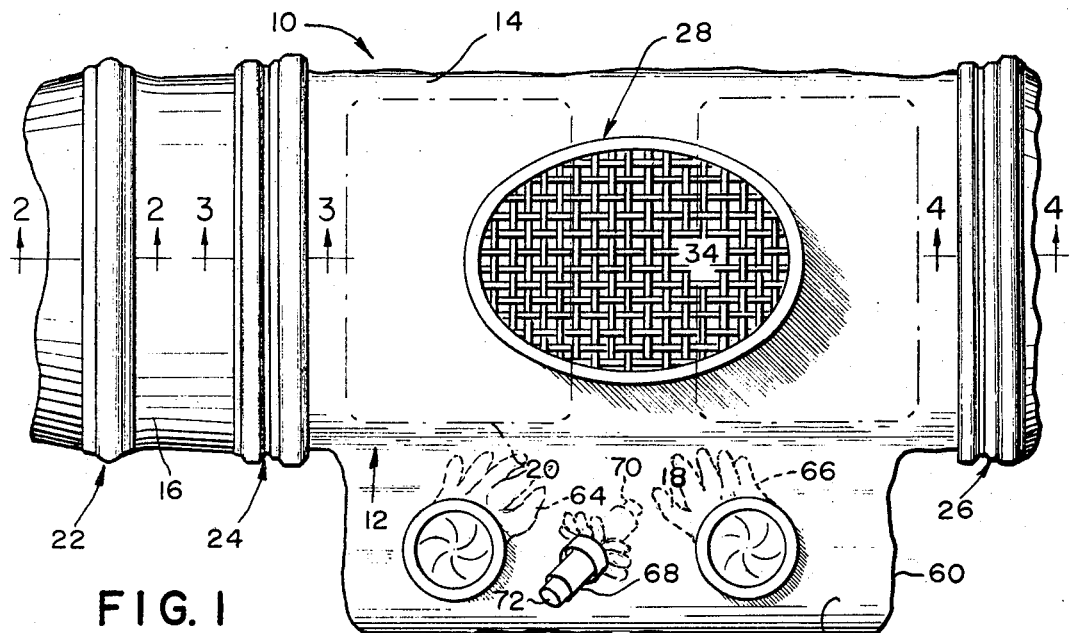
FIG. 1 is a plan view of a container illustrating the invention.
Figure 2:
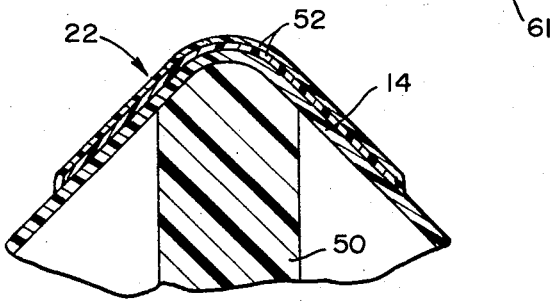
FIG. 2 is a fragmentary view taken along the line 2—2 of FIG. 1.

The isolator of FIG. 1, shown generally at 10, typically is shipped in a box or carton, within which it is enclosed and protected. Such a box, which is formed of a substantially rigid, inexpensive material such as corrugated cardboard, completely encloses the isolator and is provided with a generous number of openings in its walls for the free circulation of air. Isolator 10 is designed to be readily sterilized, to be coupled with the lock of a rearing isolator to permit transfer of animals, and to be sealed against the admission of micro-organisms. It includes means providing for circulating of filtered air through the sterile environment within the isolator. In the form shown in FIG. 1, isolator 10 comprises an elongated sleeve 14 formed of a flexible sheet of film material which is impervious to microorganisms. The film is preferably a transparent, organic plastic material allowing observation of the animals and permitting manipulation of the contents of the isolator, particularly enclosures and cages, from the exterior of the isolator. Organic plastics preferred for the sleeve include polymers which are tough and resistant to tearing and puncture, are relatively inert, can be thermally or chemically sterilized and can stretch at least slightly, preferably elastically. Examples of such materials include the vinyl polymers such as polyvinyl chloride and polyolefins such as polyethylene and polypropylene. An example of a preferred material for the sleeve is a sheet of vinyl film, having a thickness of the order of 10 to 12 mils, which is reversely folded and sealed along its longitudinal free edges to define the desired configuration.

Engaged within sleeve 14 are three closures dividing the sleeve into an outer chamber or lock 16 and an inner chamber 18 for containing live animals, either freely or in cages shown by broken lines and designated 20. The closures comprise an outer door 22 at one end of the sleeve, an inner door 24 cooperating with the outer door to define the outer chamber and an end closure 26 at the other end of the sleeve cooperating with the inner door to define inner chamber 18. The isolator shown in FIG. 1 also includes a filter 28 secured in an opening in the upper portion of sleeve 14 between door 24 and closure 26 above cages 20 for circulating air between chamber 18 and the exterior of the isolator assembly. Outer door 22 and inner door 24 are impervious to air so that chamber 16 can be sealed and sterilizing agents can be introduced into chamber 16 yet excluded from inner chamber 18 containing the animals.

Circulation of air through chamber 18 is effected by both filter 28 in the upper part of the chamber for exhausting air from the chamber and a second filter for admitting air to chamber 18 at a location below the level of filter 28. In the form shown, this second filter comprises a component of end closure 26. The two filters are arranged so that a convection current is established as the air within chamber 18 is heated by the animals and rises to pass through filter 28 while cooler air is drawn in through end closure 26 at a lower level. Increased circulation of air can be achieved, if desired, by forcing air into chamber 18 through the end closure by such means as a fan, with the air being exhausted through closure 28.

Figure 4:
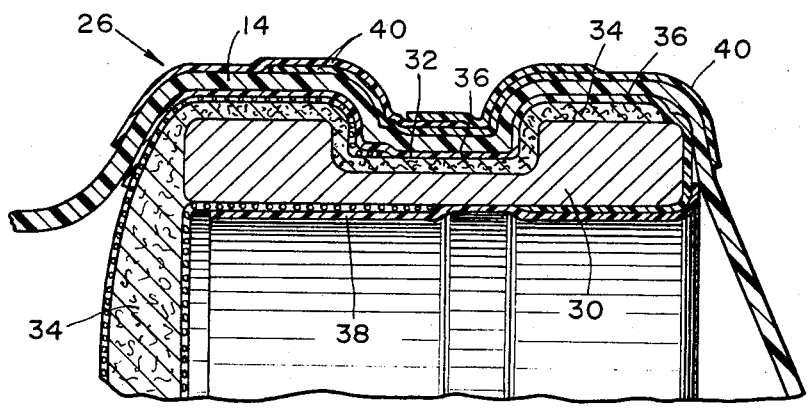
FIG. 4 is a fragmentary view taken along the line 4—4 of FIG. 1.

End closure 26 and filter 28 are similarly constructed. As shown in FIG. 4, each comprises a substantially rigid ring 30 formed, for example, of metal. The ring closure 26 is preferably circular so as to fit within sleeve 14 while the ring comprising filter 28 is preferably elliptical since it is secured within an opening in the sleeve and in this form facilitates attachment of the sleeve to the ring at this location. Each ring 30 includes an outer peripheral surface having a medial peripheral recess or groove 32 to facilitate retention of the filter material and sleeve in intimate engagement with the ring and with each other. Each of the filters comprises a diaphragm or panel 34 attached at its edges to the ring and formed of a filter material for passing air but not microorganism such as bacteria and the like. Each filter panel 34 comprises a porous or fibrous filter material such as several layers of fine glass wool (e.g., three layers of Owens-Corning FB–003 fiberglass) sandwiched between panels of a fine mesh such as conventional plastic or fiberglass window screen, which protect and confine the the fibrous filter material. The filter panel, or at least the filter material and outer mesh, is adhered at its edges to ring 30 by windings of tape 36 wound tightly about the edges of the filter and outer periphery of ring 30 so that the edge portions of the panel are compressed against and made to conform to the surface contour of the ring. Tape 36 is preferably a plastic tape having some elasticity and coated with a pressure-sensitive adhesive, e.g., conventional vinyl or polyvinyl chloride tape. Several windings of the tape are employed, with the first or inner winding overlapping and adhered to both the filter panel and the ring with successive outer windings overlapping one another. The edge of the inner protective mesh is preferably adhered to the inside of the ring by a separate winding 38 so that there is intimate contact between the fibrous filter material and the outer surface of ring 30.

The sleeve or edge portions thereof adjacent an opening therein, are secured to the outer periphery of the foregoing closure or filter assembly by additional windings 40 of the same pressure-sensitive adhesive tape applied tightly and in overlapping relation so that the material of the sleeve is retained in intimate contact with the windings of tape 36 retaining the filter panel on the ring. The sleeve also is caused to conform substantially to the contour of the peripheral surface of the ring to prevent separation of or relative movement between the ring and sleeve. This construction of the filters and their attachment to the sleeve is inexpensive and easily accomplished thereby contributing to making the entire isolater assembly expendable if desired. All of the materials employed, with the possible exception of the metal ring, are fiberglass and/or plastic, which is relatively inert and can be readily and easily sterilized either thermally or chemically.

Figure 3:
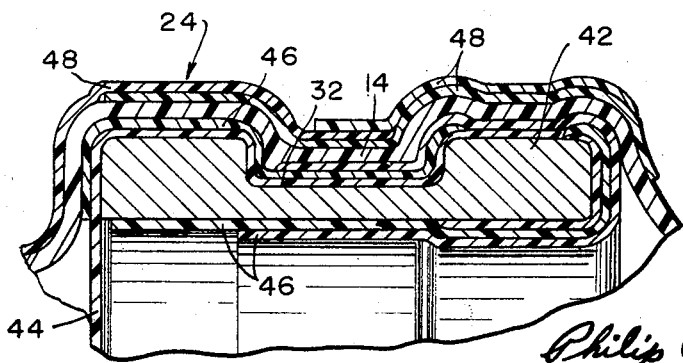
FIG. 3 is a fragmentary view taken along the line 3—3 of FIG. 1.

As shown in FIG. 3, closure 24 functions as a door which can be opened and/or sealed while remaining in a sterile condition both inside and out. Closure 24 comprises a ring 42, substantially the same as ring 30, to which is secured an air imprevious diaphragm 44 by adhesive tape windings 46. Diaphragm 44 preferably comprises a thin transparent plastic film, for example, polyethylene terephthalate resin, stretched tightly across ring 42 and bound to the ring by the tape so as to conform to the configuration of the outer peripheral surface of the ring. Thin, transparent film is the preferred material because it allows for observation of the animals through the inner door and can be ruptured or torn to gain access to chamber 18. Ring 42 may be circular and in the preferred form shown is slightly circular or elliptical to facilitate manipulation of closure 24 within the sleeve. Ring 42 is retained in closed, sealed condition by outer windings 48 or tightly wrapped, slightly elastic, pressure-sensitive adhesive tape which causes the sleeve to conform to and make intimate contact with the outer surface of the inner tape windings 46.

Outer door 22 functions to protect inner door 24 and cooperates therewith to form chamber 16 which is employed as a main lock that may be sterilized separately from chamber 18. Door 22 comprises a generally rectangular panel 50 with rounded corners formed of a rigid material such as sheet metal or plastic. The edges of panel 50 are rounded or beveled and have a girth at least equal to and preferably slightly greater than the girth of sleeve 14. Panel 50 is retained within the sleeve by multiple tape wrappings 52 engaged around the exterior of the sleeve. The girth of the panel is preferably greater than that of the sleeve so that the sleeve is stretched around the panel to make intimate contact therewith. The panel is rectangular to facilitate passing the panel through circular openings of about the same diameter as the sleeve.

Before the shipping container can be employed to hold animals, at least chamber 18 must be sterilized. This is accomplished by closing the isolater assembly and subjecting at least the inside thereof to a sterilizing treatment, for example, by applying heat to the assembly, e.g., steam, or introducing a chemical sterilizing agent into the assembly. The assembly is closed and sterilized preferably by locating the inner door within the sleeve in an open position and then sealing the outer door and introducing the serilizing agent so that the entire inner surface of the sleeve as well as the complete inner door are sterilized. After removal and/or neutralization of the sterilizing agent, the isolator assembly is ready for use, storage or shipment.

When axenic animals are to be loaded into the isolater from another isolator, inner closure 24 is manipulated into place by the operator's hands which can control the inner closure although outside sleeve 14 because sleeve 14 is sufficiently thin and flexible. Next the inner closure is secured in position by windings of pressure sensitive tape outside the sleeve. Next closure 22 is opened and either removed or allowed to remain within the sleeve which is then coupled with or sealed to the lock of another isolator. Then a sterilizing agent is introduced into the lock formed by chamber 60 of the sleeve in order to sterilize the interior thereof. Following removal and/or neutralization of the sterilizing agent, the windings retaining inner closure 24 in place are removed and the door is opened to allow transfer of animals from one isolator through its lock and the lock formed by chamber 16 to chamber 18. Next inner closure 24 is manipulated into closed position and sealed by wrapping tape tightly about the outside of the sleeve and ring 42. Outer closure 22 may, if desired, also be closed and sealed in the manner described for the purpose of ensuring that inner closure is protected against damage and/or contamination. Removal of the animals from chamber 18 to another isolator is substantially the reverse of the loading procedure and involves coupling the sleeve with the lock of the isolator and sterilizing the lock and interior of the sleeve up to and including the exterior of inner closure 24. It is unnecessary to open door 24 but instead, the door can be ruptured in which case the oblate configuration of ring 42 facilitates passage of rectangular cages therethrough.

In accordance with the present invention, as shown in FIG. 1, the sleeve is shaped at 61 to provide a slide chamber 60 for mounting a pair of gloves 64, 66 and a fairly rigid elastomeric tube 68. The opposite extremities of elastomeric tube 68 are sealed by elastomeric stoppers 70, 72. Preferably gloves 64, 66 are composed of a thin gage flexible rubber, no more than 0.001 inch thick, which permits an operator to insert his hands therein readily and to manipulate objects within the isolator while retaining a good degree of feel. Preferably, tube 68 and stoppers 70, 72 are composed of medium hard rubber, which resists radical deformation but permits sufficient surface deformation to achieve a hermetic seal between stopper and tube.

Figure 5:
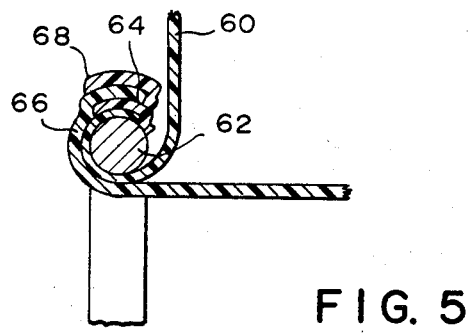
FIG. 5 is a fragmentary view taken along the line 5—5 of FIG. 1.
Figure 6:
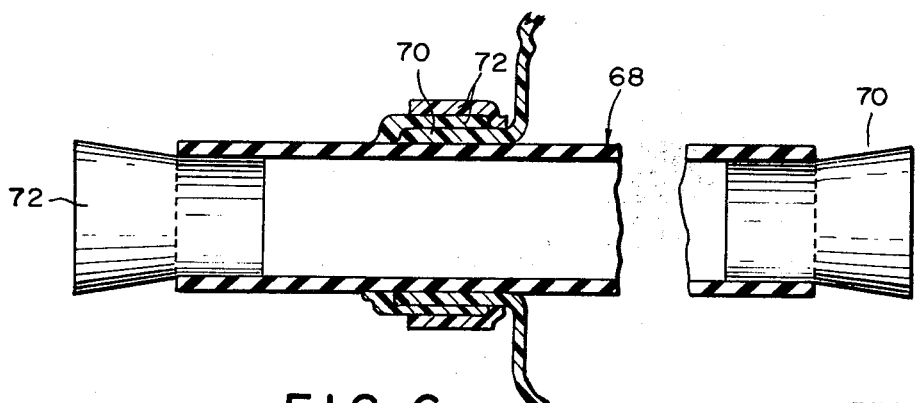
FIG. 6 is a fragmentary view taken along the line 6—6 of FIG. 1.

As shown in FIG. 5, each glove is fastened to the plastic material of side chamber 60 in the following manner. First the portions of side chamber 60 bounding an opening are extended through and wrapped around a metal ring 62. Next the reversely bent portions of side chamber 60 are sealed to ring 62 by a wrapping of vapor impermeable adhesive tape 64. Then the glove is inserted through the ring in such a way that its wrist portion 66 is wrapped around the ring. Finally the reversely bent wrist portion is sealed to the ring by a wrapping of vapor impermeable tape 68. As shown in FIG. 6, tube 68 is fastened to the plastic material of side chamber 60 in the following manner. First the portions of side chamber 60 bounding an opening are extended and crushed into the shape of a flange 70 around a medial portion of tube 68. Then several windings of vapor impermeable pressure sensitive tape 72 are wrapped around the flange, in contact with the tube as well as with the flange and each other.

In effect, tube 68 provides a miniature lock of the general type described above at 16 in FIG. 1. External stopper 72 is easily controlled by the hands of an operator outside the isolator and internal stopper 70 is easily controlled by the hands of an operator inside the isolator via the gloves. These stoppers are, in effect, inner and outer closures, which permit thermal or chemical sterilization of the lock within the tube to be effected when stopper 72 is removed. The walls of the tube itself, although preferably composed of plastic, is sufficiently thick, i.e., at least 0.015 inch, to rigidly resist undue deformation during taping to the antechamber and subsequent use.

The embodiment of the shipping container described herein constitutes an inexpensive, lightweight and easily manipulated isolator for holding live gnotobiotic animals, maintaining them in a healthy condition in an isolated environment and providing access to them conveniently. The containers can be readily sterilized and then stored indefinitely in a sterile condition ready for immediate use, and once used, may be discarded. Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. An isolation container for live gnotobiotic animals comprising, in combination:
 a sleeve formed of a flexible sheet material impervious to microorganisms;
 a closure in one end of said sleeve including a filter impervious to microorganisms for admitting air to said interior of said sleeve;
 an inner door engaged in closed relation within said sleeve intermediate the ends of said sleeve and cooperating with said closure to form a chamber for holding said animals, said inner door being air impervious and being movable within said sleeve between open and closed positions;
 means exterior of said sleeve for retaining said inner door and said sleeve in sealed relation;
 a filter impervious to microorganisms engaged within an opening in the upper portion of said sleeve between said inner door and said closure for exhausting air from said chamber;
 an outer door engaged in the other end of said sleeve in closing relation to said sleeve and cooperating with said inner door to provide a second chamber; and
 a pair of thin elastomeric gloves projecting into said chamber, writ portions thereof being hermetically connected to said sleeve; and
 an elastomeric tube extending through said sleeve into said chamber, a medial portion of said tube being hermetically connected to said sleeve, the thickness of said tube being sufficiently great to normally prevent substantially interference with the passage therethrough by deformation thereof, an inner stopper removably inserted into the inner opening of said tube, and an outer stopper removably inserted into the outer end of said tube;
 said inner stopper being accessible to the hands of an operator when received by said gloves.

2. The container of claim 1 in which said flexible sheet material is a transparent polymeric film.

3. The container of claim 1 in which each of said rims is in the form of a ring having an outer peripheral surface with a peripheral groove, and said retaining means causes said sleeve to conform substantially to the contours of said rings thereby forming a seal between said sleeve and said rings.

References Cited

UNITED STATES PATENTS

| 2,244,082 | 6/1941 | Reyniers | 128—1 |
| 2,862,307 | 12/1958 | Bloomer et al. | 312—1 |
| 3,051,164 | 8/1962 | Trexler | 312—1 |
| 3,238,922 | 3/1966 | Trexler | 119—15 |
| 3,304,913 | 2/1967 | Nesher | 119—15 |
| 3,343,520 | 9/1967 | Schwarz | 119—15 |

ALDRICH F. MEDBERY, *Primary Examiner.*